Figure 1:
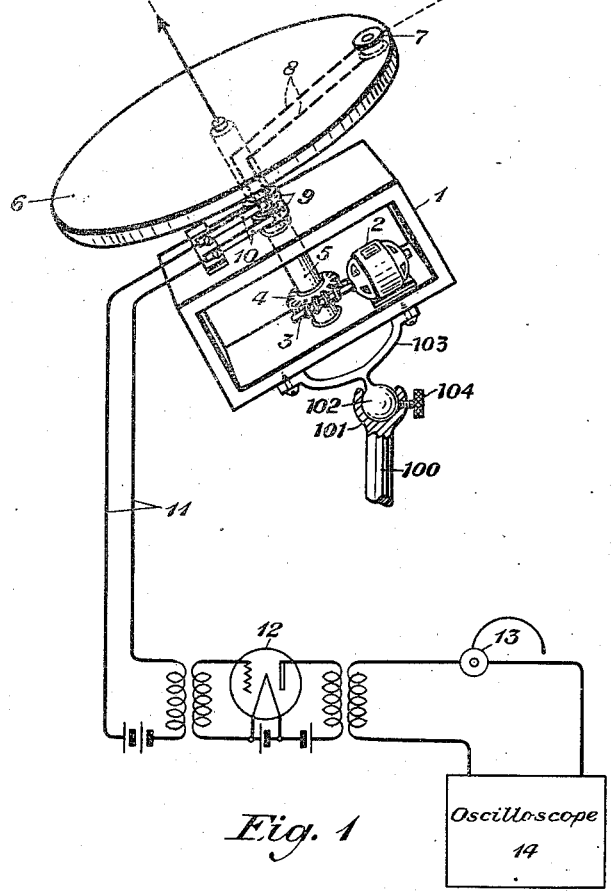

Patented Aug. 6, 1946

2,405,281

UNITED STATES PATENT OFFICE 2,405,281

OBJECT LOCATER

Edwin Walter Bemis, East Orange, N. J., assignor to American Telephone and Telegraph Company, a corporation of New York Application September 22, 1942, Serial No. 459,247

8 Claims. (Cl. 177—352)

This invention relates to the art of direction finding and more particularly to methods of and means for ascertaining the direction of a source of acoustic or other energy.

This invention utilizes a phenomenon identified in physics as the "Doppler" principle. In accordance with this principle a wave receiver, when moved toward or away from a source of waves, experiences an apparent change of frequency of incident waves with change of relative velocity, the frequency increasing when the receiver is moved toward the source and decreasing when the receiver is moved away from the source. The phenomenon is due to the fact that the rate of interception of the radiated wave, which determines the apparent frequency, is a function not only of the velocity and spacing of the waves in the medium but also of the relative movements of the transmitter and receiver. Obviously the waves may be either acoustic or electrical. If the waves are acoustic the phenomenon may be recognized by a change in the pitch of the sound as the receiver moves toward or away from the source.

The arrangements of the invention may be utilized to determine the direction of a source of acoustic waves or a source of electrical waves. To locate a source of acoustic waves a receiver, such as a microphone, might be mounted on a rotating plane surface or on a wheel. If the axis of the plane or wheel was pointed directly toward the source of sound the rotation of the microphone would not change its position with respect to the source. Its distance from the source would remain constant and the pitch of the sound would be constant. If, however, the axis of the plane or wheel was not pointed directly toward the source of sound, the rotation of the plane or wheel would move the microphone toward the source and then away from it. According to the "Doppler" principle this would cause a change in the pitch of the sound received by the microphone. Accordingly by moving the axis of the rotating plane or wheel until no change in the pitch of the sound is noted, the direction of the source of the sound may be located. To locate a source of electrical waves an antennae and suitable receiving apparatus might be substituted for the microphone. In another embodiment of my invention two or more microphones might be mounted on a continuous moving belt and so arranged that current received from those proceeding in one direction on one side of the belt could be compared with the current received from those proceeding in the other direction on the other side of the belt. The outputs of the microphone circuits connected to the two sides of the belt would differ in pitch except when the direction of travel was perpendicular to the direction of the source. Comparison might be made by ear by using two receivers or by means of an oscillograph or other indicating device. Other features and objects of the invention will appear more fully from the detailed description thereof hereinafter given.

Figure 2:
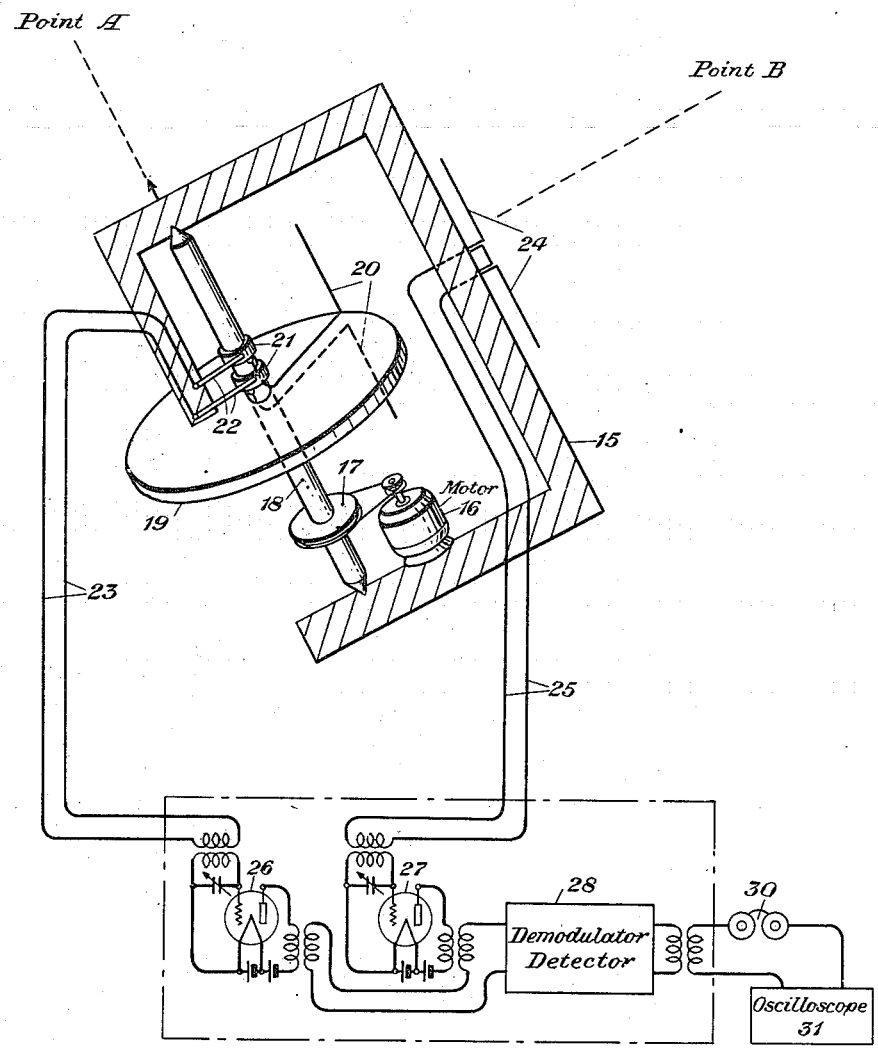
Figure 3:
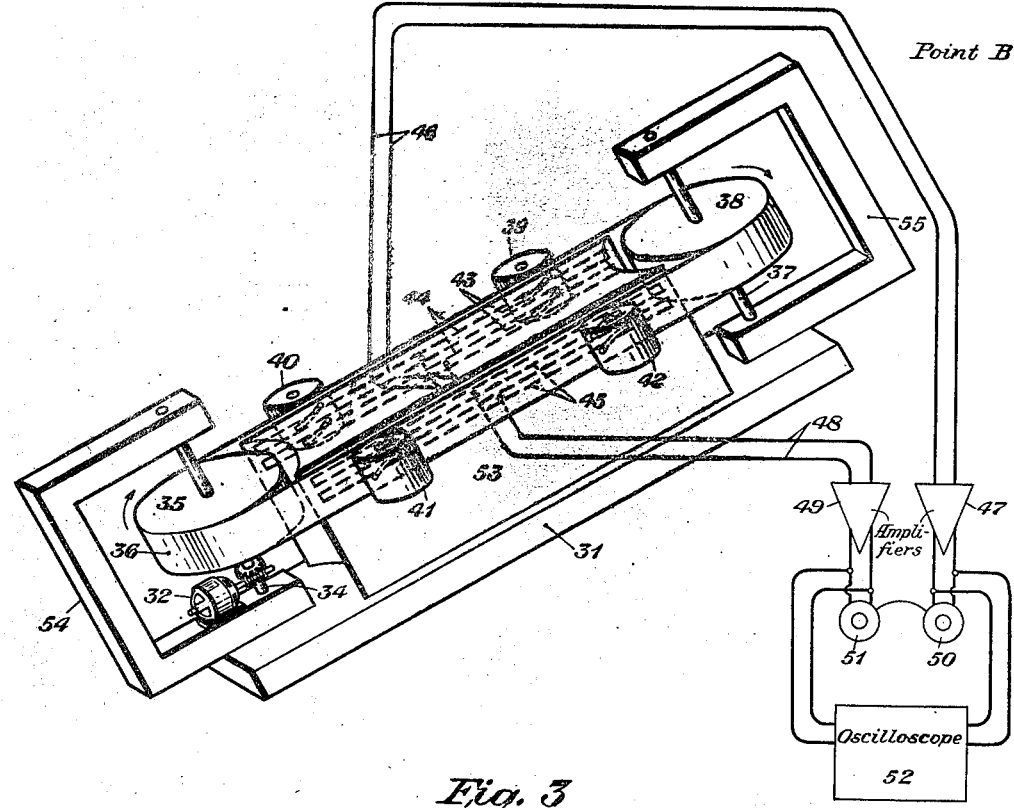

The invention may be more fully understood from the following description together with the accompanying drawings in the Figures 1, 2 and 3 of which the invention is illustrated. Figure 1 shows an arrangement for locating the direction of a source of acoustic waves. Fig. 2 shows an arrangement for locating a source of electrical waves. In Fig. 3 is a modification of the invention to be used for locating a source of acoustic waves.

In the arrangements of the invention illustrated in Fig. 1 is shown a supporting member, such for example as the box 1. In this box might be mounted a motor 2, which by means of a worm and pinion drive 3—4 could rotate a shaft 5. The rotatable shaft 5 would have attached thereto a member, such as the disc 6, which would be rotated by the shaft 5. At one of the extremities of the disc would be mounted a receiver, such as the microphone 7. The microphone 7 would be connected by conductors 8 to the contact rings 9 and wipers 10 and thence to conductors 11. Conductors 11 might be connected through an amplifier 12 to a receiver 13. Connected in series with the receiver 13 there might be provided an oscilloscope 14 if desired.

To operate the arrangements of the invention to locate the direction of a source of sound the box 1 would be moved so as to point the axis of the disc 6 in various directions. This could be done in any well known manner, for example, by the use of a ball and socket joint. The socket 101 might be attached to a support member 100. Inside the socket 101 would be the ball member 102. Attached to the ball member would be a handle 103 which would be affixed to the box 1. A screw member 104 could be provided to lock the box member in any desired position to which it had been moved by means of the handle. If the axis of the disc 6 was pointed as shown and the sound was coming from a point such as B, the rotation of the disc would alternately move the microphone 7 away from the source and towards the source. According to the "Doppler" principle this would result in a falling off and a rising in the pitch of the sound received by the microphone. This could be observed by the receiver 13 or the oscilloscope 14 and would indicate that the axis of the disc was not pointed in the direction of the source of sound. If the axis of the disc were pointed as shown and the sound were coming from a point such as A, the axis of the disc would be pointed directly at the source of sound. Under such conditions the rotation of the disc would not change the relative position of the microphone with respect to the source of the sound and the pitch of the sound observed by the receiver 13 or oscilloscope 14 would be steady and not variable. Accordingly by pointing the axis of the disc 6 in various directions until the pitch of the sound becomes steady, the operator will then know the axis of the disc is pointed directly towards the source of sound and its direction may be ascertained.

In Fig. 2 is illustrated an arrangement of the invention adapted to locate the direction of a source of electrical waves. In this arrangement there is shown a supporting member 15 on which would be mounted a motor 16 which by means of a pulley 17 would rotate a shaft 18. Affixed to the shaft 18 would be a disc or plane surface 19 which in turn would be rotated by the shaft 18. At the edge of the disc would be mounted an antenna 20 which would be revolved by the disc. The antenna would be connected through the contact rings 21 and wipers 22 to conductors 23. On the supporting member 15 would be mounted a stationary antenna 24 which would be connected to conductors 25. Conductors 23 would be connected to the input of amplifier 26 and conductors 25 would be connected to the input of amplifier 27. The outputs of amplifiers 26 and 27 would be connected to the demodulator-detector 28 which in turn would be connected to a receiver 30 and an oscilloscope 31, if desired.

To operate the arrangements of the invention shown in Fig. 2 to locate the direction of a source of electrical waves the support member 15 would be moved so as to point the axis of the disc 19 in various directions. Arrangements similar to those shown in Fig. 1 could be utilized to point the support member 15 in various directions. If the axis of the disc 19 were pointed as shown and the electrical waves were coming from a point such as B, the rotation of the disc 19 would alternatively move the antenna 20 away from the source of waves and then towards it. When the antenna 20 moved away from the source, the frequency of the received waves would decrease, and conversely when it moved toward the source, the frequency of the waves received by it would increase. On the other hand, the frequency of the waves received by the antenna 24 would remain constant. The two frequencies from these two antenna, if different, will cause beats in the output of the radio receiver apparatus. These may be observed in the receiver 30 or by the oscilloscope 31, and would indicate that the axis of disc 19 was not pointed in the direction of the source of the waves. On the other hand, if the source of waves were at point A and the axis of disc 19 were pointed as shown at the source, the rotation of disc 19 would not change the relative position of antenna 20 from the source. Under these conditions the frequencies of the waves received by each of the antennae 20 and 24 would be the same and there would be zero beat between them in the radio receiver. This would indicate that the axis of the disc 19 was pointed directly at the source of the electrical waves and would enable its direction to be located.

It is pointed out that in the arrangements shown in Fig. 2 a stationary antenna 24 was shown to provide a reference for comparison with the revolving antenna 20. However, it might not be necessary to provide and use the stationary antenna 24 as a reference if the signals from the revolving antenna were demodulated by means of any well-known heterodyne radio receiver. In this case a steady tone would indicate that the axis of the revolving disc was in line with the direction of the source of waves, while a wabbling tone would indicate any other position of the axis of the disc. In Fig. 1 only one microphone was shown. However, a second stationary microphone could, if desired, be provided on box 1 and used as a reference for comparison with the revolving microphone 7 in a manner similar to that of Fig. 2.

In Fig. 3 is shown a further modification of the arrangements of the invention which may be used to locate the direction of a source of acoustic waves. In this arrangement is shown a base member 31 having affixed thereto two end pieces 54 and 55. Mounted on end piece 54 would be a motor 32 which by means of driving mechanism would rotate a shaft 34. Mounted on shaft 34 and rotated thereby would be the pulley 35. On end piece 55 would be another rotatable shaft 37 to which would be affixed a pulley 38. On the pulleys 35 and 38 would be affixed a continuous belt 36. On the belt would be mounted the microphones 39, 40, 41 and 42. Connections to each microphone terminate in contacts in the back of the microphone belt. For example, the microphone 39 would be provided with the contacts 43 shown in dotted lines. Mounted on the base member 31 would be the member 53 which would have on its outer sides the conducting bars 44 and 45 (shown in dotted lines). Over these bars would slide the contacts of the microphones. Conducting bars 44 are connected to conductors 46 and conducting bars 45 are connected to conductors 48. Conductors 46 and 48 are connected, respectively, through the amplifiers 47 and 49 to receivers 50 and 51. If desired, there might be connected to the receivers an oscilloscope 52.

In the operation of the arrangements of Fig. 3 the motor will cause the microphones to follow the line of travel of the continuous belt. The base member 31 will be moved in various directions to shift the line of travel of the microphones. Arrangements similar to those shown in Fig. 1 could be utilized to point the base member 31 in various directions. If the base member is in the position shown and the sound is coming from a point such as B, the microphones 39 and 40 will be moving toward the source while the microphones 41 and 42 are moving away from it. Hence the pitch of the sound in microphones 39 and 40 will be higher than that in microphones 41 and 42. This could be observed in receivers 50 and 51 or by the oscilloscope 52. If the device is in the position shown and the sound is coming from point A, the movement of the continuous belt will cause no material change in the positions of the microphones with respect to the source, and hence the pitch of the sound observed by each microphone will be the same. Accordingly, by moving the base member 31 until the direction of travel of the microphones is perpendicular to the direction of the source and the pitch of the sound observed by each microphone is the same, the direction of the source of sound may be ascertained.

While the invention has been disclosed as embodied in certain specific forms which are deemed desirable, it is understood that it is capable of embodiment in many and other widely varied forms without departing from the spirit of the invention as defined by the appended claims.

What is claimed is:

1. The method of locating a source of sound which comprises continuously rotating a sound receiver in an orbit and pointing the axis of said orbit in various directions whereby if said axis is pointed at said source of sound the pitch of the sound in said sound receiver will be constant and if said axis is not pointed at said source the pitch of the sound in said sound receiver will due to the "Doppler effect" be variable.

2. The method of locating a source of sound which comprises continuously moving a sound receiver in a plane about the periphery of a geometric area and pointing the axis of said plane in various directions whereby if said axis is pointed at said source of sound the pitch of the sound in said sound receiver will be constant and if said axis is not pointed at said source the pitch of the sound in said sound receiver will due to the "Doppler effect" be variable.

3. The method of locating a source of waves which comprises continuously moving a device for picking up waves in a plane about the periphery of a geometric area, pointing the axis of said plane in various directions and detecting the picked up waves whereby if said axis is pointed at said source the detected waves will have a constant frequency and if said axis is not pointed at said source the detected waves will due to the "Doppler effect" not have a constant frequency.

4. A device for locating a source of waves comprising a microphone, means for continuously moving said microphone in a plane about the periphery of a geometrical area, a receiver connected to said microphone, and a support member for said means adapted to be moved in various directions for pointing the axis of said plane in different directions whereby if said axis is not pointed at the source of waves the frequency of the output of the receiver will due to the "Doppler effect" be variable rather than constant.

5. A device for locating a source of waves comprising a support member, a device for picking up waves, means mounted on said support member for continuously moving said device in a plane about the periphery of a geometrical area, and a receiver connected to said device, said support member being adapted to be moved in various directions for pointing the axis of said plane in various directions whereby if said axis is not pointed at the source of waves the frequency of the output of the receiver will due to the "Doppler effect" be variable and if said axis is pointed at the source of waves the frequency of the output of the receiver will be constant.

6. A device for locating a source of waves comprising a support member, mechanism mounted on said support member, a disk continuously rotated by said mechanism, a microphone mounted at the periphery of said disk and a receiver connected to said microphone, said support member being adapted to be moved in various directions whereby the axis of said disk may be pointed in various directions and said receiver utilized to determine whether or not said microphone in its travel is subject to the "Doppler effect."

7. A device for locating a source of waves comprising a support member, a stationary device for picking up sound waves, a second device for picking up sound waves, means mounted on said support member for continuously moving said second device in a plane about the periphery of a geometrical area, said support member being adapted to be moved in various directions for pointing the axis of said plane in various directions whereby if said axis is not pointed at the source of waves the frequency of the waves in the output of said second pick-up device will due to the "Doppler effect" be variable and if said axis is pointed at said source of waves the frequency of the waves in the output of said second pick-up device will be constant, and a receiver connected to both of said pick-up devices for observing the characteristics of the waves picked up thereby.

8. A device for locating a source of waves comprising a support member, mechanism mounted on said support member, a circular member continuously rotated by said mechanism, microphones mounted at opposite sides of the periphery of said circular member, and receivers connected to each of said microphones, said support member being adapted to be moved in various directions whereby the axis of said circular member may be pointed in various directions and said receivers utilized to compare the waves picked up by each of said microphones.

EDWIN WALTER BEMIS.